(12) United States Patent
Shen

(10) Patent No.: US 7,161,451 B2
(45) Date of Patent: Jan. 9, 2007

(54) MODULAR PERMANENT MAGNET CHUCK

(75) Inventor: Chi-Hung Shen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/106,333

(22) Filed: Apr. 14, 2005

(65) Prior Publication Data

US 2006/0232367 A1 Oct. 19, 2006

(51) Int. Cl.
*H01F 7/20* (2006.01)

(52) U.S. Cl. .................. 335/289; 335/291

(58) Field of Classification Search .......... 335/285, 335/287, 289, 291
See application file for complete search history.

(56) References Cited

U.S. PATENT DOCUMENTS

| | | | |
|---|---|---|---|
| 2,972,485 A | * | 2/1961 | Ferchland .............. 335/295 |
| 3,968,986 A | * | 7/1976 | Nagata ................. 294/65.5 |
| 4,250,478 A | | 2/1981 | Cardone et al. |
| 4,314,219 A | | 2/1982 | Haraguchi |
| 4,542,890 A | * | 9/1985 | Braillon ................. 269/8 |
| 5,435,613 A | | 7/1995 | Jung |
| 6,076,873 A | | 6/2000 | Jung |

* cited by examiner

*Primary Examiner*—Elvin Enad
*Assistant Examiner*—Bernard Rojas
(74) *Attorney, Agent, or Firm*—Kathryn A. Marra

(57) ABSTRACT

A permanent magnet chuck for holding or lifting workpieces is formed of two overlying/underlying flat surfaced chuck layers having a common center of rotation. In each chuck layer an even number of permanent magnet plates radiate from the center of rotation at equal angles with blocks of magnetically soft material between them. The permanent magnet plates are magnetized so that the interposed soft magnet blocks exhibit alternating N-S magnetic polarities. The organization of the permanent magnet plates and soft magnet bodies is matching and complementary so that relative rotation of the chuck layers magnetically activates or de-activates the chuck.

12 Claims, 3 Drawing Sheets

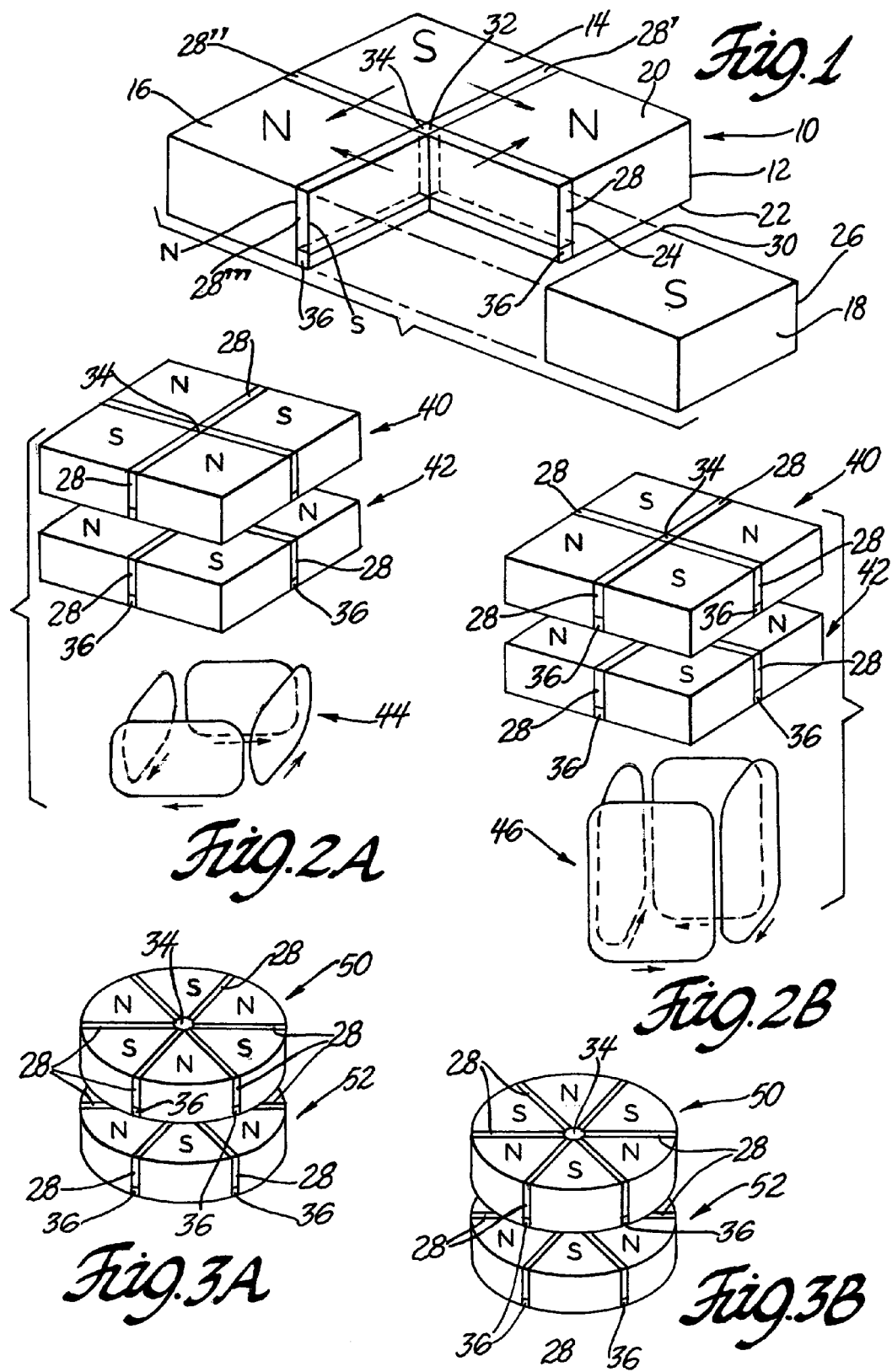

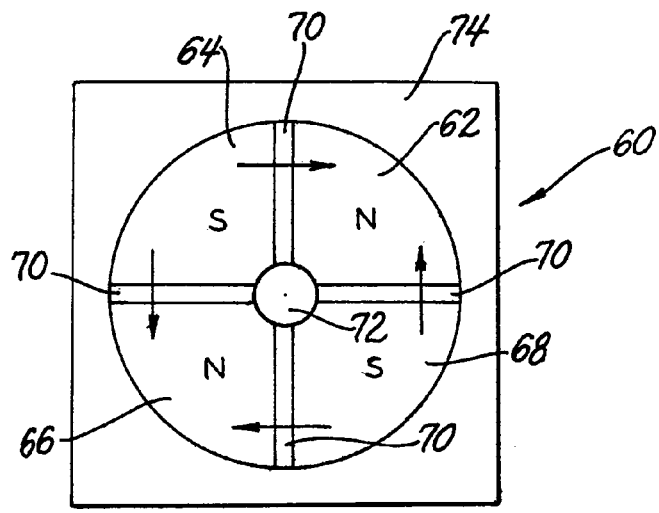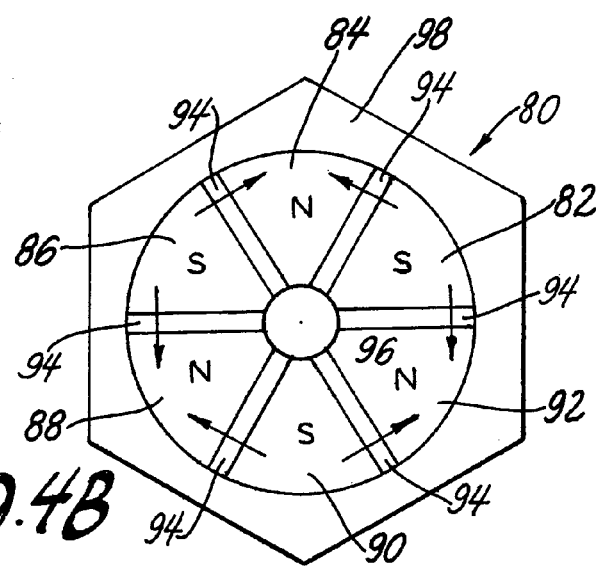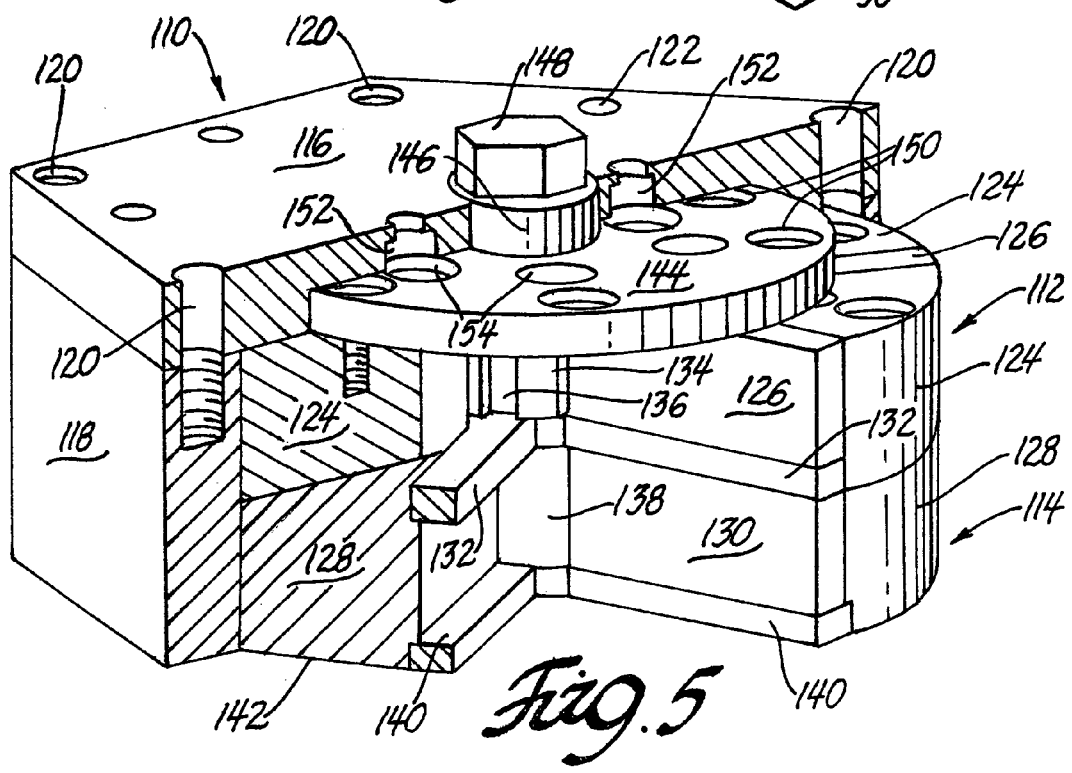

MODULAR PERMANENT MAGNET CHUCK

TECHNICAL FIELD

This invention pertains to modular permanent magnet chucks. More specifically, this invention pertains to a magnetic chuck comprising two layers of permanent magnet sheets or plates interposed with larger soft magnet blocks. Each layer contains an even number of similarly shaped permanent and soft magnet bodies, and one chuck layer is rotated with respect to the other to convert the chuck from a magnetically inactive state to an active state for holding workpieces.

BACKGROUND OF THE INVENTION

Manually activated permanent magnet chucks have been in existence for many years. One of the common applications is as a work-holding device used in machining operations on grinders, lathes, and mills. Another application is a mechanical lifter for material handling purposes. These permanent magnet chucks usually have relatively low levels of attractive force and their load carrying capacities are somewhat limited. Consequently, the magnetic chucks are very bulky in their physical dimensions and have large surface contact areas in order to meet their performance targets.

Typically permanent magnet chucks have a movable magnet portion that must be rotated from an inactive position to a magnetically active position for use of the chuck. In prior designs, activation of the chuck is often accomplished by actuation of a lever on the side of the device. Typically the arrangement of the magnets in the chuck is such that the actuating lever must be moved through a large angle of rotation, typically ranging from 120° to 180°. These conditions pose physical obstructions in many practical workplace applications where there is not room for the sweeping reach of such a side-located lever.

SUMMARY OF THE INVENTION

This permanent magnet chuck design provides a unique architecture of complementary overlying/underlying layers of magnetic members. Each layer comprises a like pattern of alternating thin permanent magnet pieces (sheets or plates) and larger magnetically soft (e.g. iron or low alloy steel) blocks. Rectangular permanent magnet sheets or plates are placed on edge in each chuck layer, and the thin pieces are magnetized through their thickness so that one main face of the sheet is a magnetic north pole (N) and the opposite face is a magnetic south pole (S). Larger soft magnet blocks are placed at each face of the permanent magnet sheet to receive and direct the magnetic flux emanating from the magnetic poles of the interpositioned permanent magnet. Thus, an even number of the soft magnet block pieces are used in each clutch layer.

In a preferred embodiment of the invention each chuck layer is shaped like a disk with four, six, eight, or more radial permanent magnet plates each separated by identical, pie-shaped magnetically soft steel blocks. One end of each permanent magnet plate lies at the center of the disk and the other end at the circumference. The close lying central ends of the permanent magnet layers are separated by a rod or bar of non-magnetic material such as brass to prevent magnetic flux from passing directly from the end of one permanent magnet to another. The permanent magnet plates are placed with N poles facing N poles and S poles facing S poles. The induced polarities of the intervening soft magnet blocks are, thus, alternating N-S-N-S for a four permanent magnet clutch layer. In other embodiments of the invention, the chuck layers may be shaped as regular polygons for example, square, hexagonal, or octagonal, with the permanent magnet pieces extending from the center of the shape to its periphery.

A chuck assembly includes two complementary (preferably matching) chuck layers placed in face to face (overlying/underlying) arrangement with the edges of the permanent magnet pieces aligned and the soft magnet blocks aligned. The facing edges of the permanent magnets in the facing chuck layers are separated by strips of non-magnetic material to minimize short circuiting of magnetic flux between permanent magnets.

When facing soft magnet blocks between the chuck layers are of opposite polarity (N-S) the chuck is in a magnetically inactive state because the magnetic flux lines are directed within the facing chuck layers. The magnetic chuck is then tuned "off" and will not attract a ferromagnetic workpiece to its working face. However, when one chuck layer is rotated respect to the other so that facing soft magnet blocks are of the same polarity (N—N and S—S) then the chuck is magnetically activated and will strongly attract and hold a ferromagnetic workpiece. With inter-chuck layer facing magnet blocks of the same polarity, magnetic flux lines extend well above the working face of the chuck assembly into a ferromagnetic workpiece, and the device is turned "on." The rotation of a chuck layer is accomplished from the top or bottom of a horizontal layer chuck. In preferred embodiments of the chuck design, the required rotation is no more than 90°. The arrangement of an even number of alternating permanent magnet plates and soft magnet blocks effectively utilizes the magnetic flux of the permanent magnets in the magnetically active alignment of the chuck layers.

The relatively thin permanent magnet bodies (sheets or plates) are made of any suitable permanent magnet material such as neodymium-iron-boron compositions, rare earth element-cobalt compositions, hard ferrite compositions, or the like. Magnetically soft iron and/or magnetically soft alloys of iron-silicon, nickel-iron and soft ferrites are suitable for use as flux carriers between the magnet blocks. Brass or other non-magnetic materials are placed between the central edges of the permanent magnet bodies in each chuck layer and at facing edges of permanent magnet bodies between chuck layers to minimize "short-circuiting" of magnetic flux between permanent magnets.

The use of complementary or matching chuck layers of alternating thin permanent pieces and larger soft magnet blocks enables the concentration of a high level of magnetic flux in a workpiece. The flux is concentrated in a clutch face most of which is soft magnet material. The magnitude of attractive magnetic force appears to be maximized with respect to the inherent magnetic properties of the permanent magnet and soft magnet pieces. This chuck architecture permits the use of smaller structures, or lower-in-height structures, for a given chuck application. And, as stated, when the chuck layers and working face of the device are oriented horizontally, a chuck layer can be positioned or rotated for magnetic activation from the top or bottom of the chuck.

The two chuck layers of permanent magnet plates and soft magnet bodies are enclosed in a suitable chuck frame of non-magnetic material. The chuck layers are enclosed in the frame so that one layer can be rotated with respect to the other for magnetic activation of the chuck. Usually one face of one chuck layer will be the working face of the chuck to hold workpieces, and means will be provided as part of the frame for rotation of the other chuck layer. A single two complementary layer chuck assembly of suitable size and shape can be used as a magnetic chuck for holding workpieces. Alternatively, a plurality of individually-actuated, two layer chuck assemblies of this invention can be incorporated in a frame suitable for handling a workpieces of varying sizes and shapes. In this embodiment of the invention, individual chuck elements in a chuck frame can be adapted for a workpiece by selective activation of the magnet elements forming a footprint of the workpiece.

Other objects and advantages of the invention will be apparent from a more detailed description of preferred embodiments.

BRIEF DESCRIPTION OF THE DRAWINGS

FIG. 1 is an oblique view of one layer of a magnetic chuck embodiment comprising four rectangular permanent magnet plates arranged on their side edges as four arms of a cross and separating four identical square soft magnet blocks. The lower right-hand soft magnet block is pulled aside in an exploded position to better reveal the relatively thin permanent magnet pieces between the other three soft magnet blocks.

FIG. 2A is an oblique view of two square chuck layers, each layer containing four permanent magnet plates and four square soft magnet blocks as illustrated in FIG. 1. In FIG. 2A the layers are positioned so that the chuck is in a magnetically inactive state for holding ferromagnetic workpieces against a working surface of the chuck.

FIG. 2B is an oblique view of two chuck layers like that of FIG. 2A with the upper chuck layer rotated 90° from its position in FIG. 2A so that the two chuck layers are in a magnetically active state for holding ferromagnetic workpieces.

FIG. 3A is an oblique view of two round chuck layers (disks) illustrating another embodiment of this invention. Each chuck layer includes six radially positioned permanent magnet plates separated by six arcuately shaped (pie shaped) soft magnet blocks with alternating north-south magnetic poles. In FIG. 3A the layers are positioned so that the chuck is in a magnetically inactive state for holding ferromagnetic workpieces against a working surface of the chuck.

FIG. 3B is an oblique view of two chuck layers like that of FIG. 3A with the upper six permanent magnet plates and six soft magnet block chuck layer rotated 60° from its position in FIG. 3A so that the two chuck layers are in a magnetically active state for holding ferromagnetic workpieces.

FIG. 4A is a plan view of a round permanent magnet/soft magnet chuck layer assembly in a square non-magnetic frame, the combination formed for compact rotation of the layer in an assembled two layer chuck between magnetically active and magnetically inactive positions.

FIG. 4B is a plan view of a round magnet chuck layer assembly in a hexagonal non-magnetic frame, the combination adapted for compact rotation of the layer in an assembled two layer chuck between magnetically active and magnetically inactive positions.

FIG. 5 is an oblique view, partly broken away and in cross-section, of an assembled six soft magnet block per chuck layer, two layer permanent magnet chuck.

DESCRIPTION OF PREFERRED EMBODIMENTS

Figure 6:
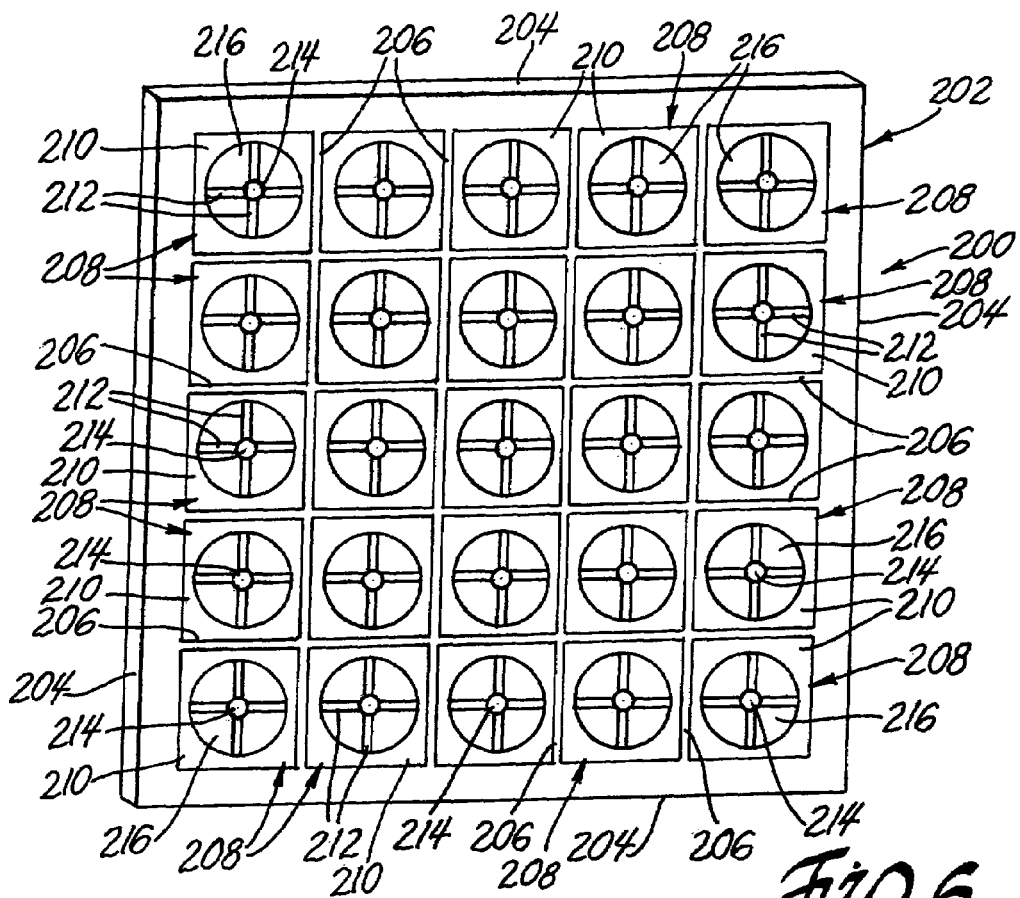
FIG. 6 is a view of the front face of a magnetic chuck comprising a frame with a planar array of twenty-five modular magnetic chuck members.

This invention provides a design for a compact, modular, two layer permanent magnet chuck. The arrangement of relatively thin permanent magnet pieces between larger soft magnet blocks in cooperatively matching layers of the chuck results in a compact device that provides a high magnetic flux per unit volume of the chuck. In other words, lower or smaller chucks can be used in a workpiece lifting or holding application.

The modular chuck comprises two geometrically similar or identical layers of identical or interchangeable permanent magnet and soft magnet members. FIGS. 1 and 2A and 2B illustrate an embodiment of the invention in which four identical square soft magnet blocks are used in each layer of the chuck assembly. In FIG. 1, one clutch layer 10 comprises four identical square soft magnet blocks 12, 14, 16 and 18 with flat top 20 and bottom 22 surfaces (indicted only on block 12 for simplicity of illustration). As stated above, soft magnet block 18 is pulled out of its position in clutch layer 10 to better illustrate the permanent magnet and non-magnetic clutch elements between the four soft magnet blocks. Soft magnet blocks 12, 14, 16, and 18 are made of soft ferromagnetic material such as compacted iron powder, alloys of iron-silicon, nickel-iron, or soft ferrite material.

Four rectangular permanent magnet plates 28, 28', 28", and 28'" are positioned like the arms of a cross (or like radii) between soft magnet blocks 12, 14, 16, and 18. For example, permanent magnet plate 28 lies between side face 24 of soft magnet block 12 and side face 26 of soft magnet block 18. The permanent magnet plates 28, 28', 28", and 28'" are identical in this example, but are separately identified because of the positioning of their magnetic poles in clutch layer 10. Each permanent magnet plate 28, etc. is magnetized with N-S poles on its major rectangular faces as illustrated in FIG. 1 with respect to permanent magnet plate 28'". One end of each plate is positioned toward the center of rotation 32 of clutch layer 10. A bar (or rod) 34 of non-magnetic material separates the central ends of permanent magnet plates 28, 28', 28", and 28'". Four bars 36 of non-magnetic material are placed respectively at the bottom edges of the four rectangular permanent magnet plates 28, etc, to space the permanent magnet plates in clutch layer 10 from like permanent magnet plates in a facing clutch layer (not shown in FIG. 1) in an assembled magnetic chuck. Permanent magnet plates 28, 28', 28", and 28'" are made of any suitable permanent magnetic material such as Fe—Nd—B, hard ferrites, rare earth element-cobalt compositions or the like.

Permanent magnet plates 28, 28', 28", and 28'" are arranged in clutch layer 10 so that their N-S magnetic poles cooperate in magnetizing soft magnet blocks 12, 14, 16, and 18 with alternating magnetic polarities (N or S) as indicated in FIG. 1 (and in each of the drawing figures). Permanent magnet plates 28 and 28'" are positioned with their S poles facing soft magnet block 18. The N magnetic poles of permanent magnet plates 28 and 28' make soft magnet block 12 of N polarity. The S magnetic poles of permanent magnet plates 28' and 28" make soft magnet block 14 of S polarity. And the N magnetic poles of the faces of permanent magnet plates 28" and 28'" render soft magnet block 16 of N polarity. Thus, in single chuck layer 10, the direction of magnetic flux lines is as indicated by the four arrows on the upper face of clutch layer 10. The magnetic flux resulting from the respective polarities of rectangular permanent magnet plates 28, 28', 28'', and 28''' is effectively concentrated in soft magnet blocks 12, 14, 16, and 18 and results in their alternating magnetic polarities indicated on their upper surfaces in FIG. 1.

The respective sizes of permanent magnet plates 28, 28', 28'', and 28''' and soft magnet blocks 12, 14, 16, and 18 in plan view and height are determined by the designer of the modular chuck based on the required working surface area and magnetic attraction force of the chuck in its intended workpiece-holding application.

FIGS. 2A and 2B show two-layer chuck assemblies including upper chuck layer 40 and lower chuck layer 42. Chuck layers 40, 42 each include four relatively thin, rectangular permanent magnet plates 28 extending outwardly from a central bar 34 of non-magnetic material. The four mutually perpendicular permanent magnetic plates separate four square soft magnet blocks in each layer which are identified in FIGS. 2A and 2B only by their alternating magnetic polarities (N-S-N-S) for simplicity of illustration. As described in reference to FIG. 1, the respective alternating magnetic polarities of the soft magnet blocks are the result of the alternating N-S magnetic polarities through the thicknesses of the permanent magnet plates 28.

When four-soft magnet block chuck layers 40, 42 are placed on top of each other such that overlying/underlying soft magnet blocks are of opposite N-S magnetic polarity as indicated in FIG. 2A, the resulting magnetic flux lines are close-circuited among the magnetically soft, iron blocks so that the chuck as a whole (layers 40, 42) is completely balanced and neutralized magnetically. The close-circuited magnetic flux line pattern 44 is illustrated below chuck layers 40, 42 as part of FIG. 2A. In this orientation of chuck layers 40, 42, the assembled chuck is now in the "magnetically inactive" state and it will not exert significant attractive force on an external ferromagnetic object.

However, if top chuck layer 40 is rotated 90° such that overlying/underlying soft magnet blocks are of the same polarities, N—N and S—S, of the two layers are now aligned as illustrated in FIG. 2B, the magnetic circuits of clutch layers 40, 42 are incomplete and remain open. The magnetic flux pattern 46 of the rotated chuck layer assembly is illustrated in FIG. 2B. The magnetic chuck, comprising chuck layers 40, 42, is in the "magnetically active" state and will need to attach an external object to complete the flux loop. Because of the particular arrangement of the permanent magnet plates 28 and the large volume of soft iron layers N-S-N-S packaged in this invention, the magnitude of the attractive magnetic force generated is much higher than anything that has so far been developed. With the present invention, the overall height of the chuck is comparatively much lower than conventional ones.

As a further illustrative embodiment of the invention, a round (or, optionally, hexagonal) clutch layer arrangement 50, 52 for a set of six (6) radially aligned rectangular permanent magnet plates 28 per layer is illustrated in FIGS. 3A and 3B. For simplicity of illustration, the identical pie shaped soft magnet blocks are designated by the magnetic polarity induced in them by the alternating poles of permanent magnet plates 28. Each soft magnet block N, S, N, S, N, and S has a center edge located at the center of rotation of the layer. A rod of non-magnetic material 34 separates the central edges of the six rectangular permanent magnet blocks 28. The radially extending side walls of the soft magnet blocks N, S, N, S, N, and S are separated by permanent magnet plates 28, and the outer walls of the soft magnet blocks N, S, N, S, N, and S are arcuately shaped, spanning 60° of arc. Radially extending bodies 36 of non-magnetic material separate the lower edges of permanent magnet plates 28 in clutch layer 50 from matching permanent magnet plates 28 in facing clutch layer 52. The non-magnetic material bodies 34, 36 minimize the passage of magnetic flux lines directly between adjacent permanent magnet plates 28, but force the flux through adjacent soft magnet blocks. As a result of the alternating arrangement of the magnetic poles of the six permanent magnet blocks 28, the soft iron blocks N, S, N, S, N, and S assume the magnetic polarities imposed by the permanent magnet plates 28 at their radial sides. Thus, the magnetic state of the soft magnet blocks in chuck layers 50, 52 is as indicated in FIG. 3A.

When two six-magnetic block, round chuck layers 50, 52 are placed on top of each other with soft magnet blocks of opposite N-S polarities aligned as indicated in FIG. 3A, magnetic flux lines are close-circuited among chuck layers 50, 52 so that the chuck as a whole is completely balanced and neutralized magnetically. The chuck is now in the "inactive" state and it will not exert attractive force on an external ferromagnetic object. However, if one magnet block layer, for example, the top chuck layer 50 is rotated only 60° such that soft magnet blocks of the same polarities N—N and S—S of the two layers are now aligned with each other (FIG. 3B), the magnetic circuits are incomplete and remain open. The magnetic chuck, comprising permanent magnet block chuck layers 50, 52, is in the "active" state and will need to attach an external object to complete the flux loop.

In principle, the two chuck layer concept can be extended to sets of 8, 10, 12, or more permanent magnet arrangements for very much larger and stronger chucks. The chuck with two sets of four magnets can be designed to form a square base while the chuck with two sets of six magnets can be designed to form a hexagonal base.

FIGS. 3A and 3B illustrate a magnetic chuck with round layers which are convenient for rotation of one layer between magnetically active and inactive positions within the plan view of the chuck. However, it may be preferred to have a magnetic chuck including a non-magnetic frame in which the overall plan-view shape of the chuck is not necessarily round. For example, FIGS. 4A and 4B, respectively, illustrate square and hexagonal chuck frame configurations that are adapted to hold round permanent magnet plate/soft magnet block assemblies. Sometimes it is desirable to have a chuck frame that is not round for placing or handling of the chuck while having a round magnet assembly for ease of rotation between chuck active and inactive positions.

FIG. 4A illustrates chuck layer 60 with a square non-magnetic (for example, brass) frame 74 enclosing a round assembly of four soft magnet blocks with interposed permanent magnet plates. FIG. 4B illustrates a chuck layer 80 with a hexagonal non-magnetic frame 98 enclosing a round assembly of six soft magnet blocks and interposed permanent magnet plates. Only the round magnet assemblies of the respective chuck layers need be rotated within the stationary non-magnetic frames of any suitable plan view shape.

In the FIG. 4A plan view, square chuck layer 60 includes a round assembly of four rectangular permanent magnet plates 70 between four pie-shaped soft magnet blocks 62, 64, 66, and 68. Permanent magnet plates 70 are placed on their side edges and in the configuration of a cross. The central edges of outwardly extending permanent magnet plates 70 are separated by a rod-shaped body 72 of nonmagnetic material. Permanent magnet plates 70 are magnetized in the direction between their major faces and positioned in chuck layer 60 to induce alternating magnetic polarities in soft magnet blocks 62, 64, 66, and 68. Arrows show the direction of magnetic flux between the alternating N-S-N-S polarity of soft magnet blocks 62, 64, 66, and 68.

The round assembly of permanent magnet plates 70 and soft magnet blocks 62, 64, 66, and 68 is enclosed within non-magnetic frame 74 which has a square perimeter for placement or handling in a work environment for chuck layer 60.

FIG. 4B illustrates, in plan view, a hexagonal chuck layer 80 made of six identical pie shaped soft magnet blocks 82, 84, 86, 88, 90 and 92. The respective soft magnet blocks are arranged side-by-side with central edges separated by a body 96 of non-magnetic material. Radially extending, facing sides of soft magnet blocks 82–92 are separated by radially extending permanent magnet plates 94. The positioning of magnetized permanent magnet plates 94 induces alternating S-N-S-N-S-N polarities, respectively in soft magnet blocks 82, 84, 86, 88, 90 and 92 as indicated by the arrows in FIG. 4B. The round assembly of permanent magnet plates 94 and soft magnet blocks 82–92 is confined within non-magnetic frame 98. In this illustration frame 98 has a hexagonal perimeter. Thus, the inner round assembly of six soft magnet blocks and interposed permanent magnet plates is rotated 60° to convert a two layer chuck from an inactive position to a magnetically active position, or vice versa.

FIG. 5 illustrates an assembled, two-layer, permanent magnet chuck 110 of the six permanent magnet plate, six pie-shaped soft magnet block, circular (disk) chuck layer embodiment as described with respect to FIGS. 3A, 3B, and 4B. FIG. 5 is a sectional view. The assembled permanent magnet chuck 110 has two circular chuck layers, upper chuck layer 112 and lower chuck layer 114. Chuck layers 112 and 114 are supported in a brass (non-magnetic) chuck frame that includes a hexagonal top 116 and a side wall 118 that has a hexagonal periphery with a round internal surface to receive round chuck layers 112 and 114. Top 116 is suitably bolted to side wall 118 through bolt holes 120. Top 116 may also have bolt holes 122 for eye-bolts for lifting of magnet chuck 110.

Upper chuck layer 112 is adapted to be rotated, as will be described, between magnetically activated and magnetically in-activated positions of chuck 110. Lower chuck layer 114 is fixed stationary within side wall 118 of the frame of chuck 110. Upper chuck layer 112 has six pie-shaped soft magnet (iron or low alloy steel) blocks 124 and six interposed permanent magnet plates 126, although only a few of the plates and blocks are visible in the FIG. 5 sectional view. Permanent magnet plates 126 are suitably formed of an iron-neodymium-boron composition and magnetized through the thickness of the plate as described above, to induce alternating magnetic polarities in the six soft magnet blocks 124. Each pair of one soft magnet block 124 and adjacent permanent magnet plate nominally spans about 60° of the circumference of chuck layer 112.

Lower chuck layer 114 also has six pie-shaped soft magnet blocks 128 and six interposed permanent magnet plates 130. Except for modifications for mechanical attachment in their respective chuck layers 112, 114, the soft magnet blocks 124, 128 in the two layers are of matching shape and composition. And the permanent magnet plates 126, 130 are likewise matching in shape and performance.

Upper chuck layer 112 also includes non-magnetic bars or ribs 132 fixed at one end to a non-magnetic, rotatable vertical hub 136. These non-magnetic components are suitably made of brass. Six nonmagnetic bars 132 extend radially in chuck layer 112 from hub 136 to the circumference of the chuck layer 112 and underlie a permanent magnet plate 126, separating that plate 126 from a matching permanent magnet plate 130 in the lower chuck layer 114. Hub 136 contains six vertical slots to receive inward ends of permanent magnet plates 126. In addition to supporting permanent magnet plates 126, non-magnetic bars 132 prevent magnetic flux from magnet plates 126 from directly combining with magnetic flux from permanent magnet plates 130. It is preferred that the flux from the respective permanent magnet plates 126, 130 be directed into the flux enhancing soft magnet blocks 124, 128.

Lower chuck layer 114 also has a central non-magnetic hub 138, but hub 138 is not adapted for rotation in this example. Fixed to hub 138 and extending radially outwardly at 60° angles are six non-magnetic bars or ribs 140. Each of bars 140 lies under a permanent magnet block 130. Bars 140 are secured at their outer ends to frame side wall 118 and prevent rotation of soft magnet bodies 128.

As viewed in FIG. 5, the lower surface 142 of chuck 110 is the non-rotating working face of the chuck against which workpieces are to be held. Surface 142 is enclosed within frame sidewall 118 and includes the bottom surfaces of non-magnetic bars 140 and the bottom surfaces of the six pie-shaped soft magnet blocks 128 through which the magnetic flux of the chuck is directed.

Upper chuck layer 112 is adapted to be rotated with respect to lower chuck layer 114 to activate chuck 110. The relative rotation of round six member permanent magnet plate-soft magnet block chuck layers is as illustrated in FIGS. 3A, 3B, and 4B. Hub 134 of upper chuck layer 112 is connected to a round chuck layer rotor 144. Rotor 144 is received in a suitable cavity formed in the inner surface of chuck frame top 116. Rotor journal 146 is positioned in a center hole in frame top 116. Fixed to the top of journal 146 is a hexagonal lug nut head 148 for gripping with a wrench or other tool or means for rotating chuck layer 112 through an angle of 60° with respect to lower chuck layer 114. Boltholes 150 are provided at the periphery of rotor 144 for attachment to soft magnet blocks 124 in chuck layer 112. Index holes 152 in frame top 116 may be used with springs and studs (not shown) in holes 154 in rotor 144 for controlling precise positioning of chuck layer 112. Thus, chuck layer 112 with its central hub 134 and attached rotor 144, rotor journal 146 and lug nut 148 are movable elements of chuck 110. As stated, the effect of the relative rotation of the chuck layers is as described with respect to FIGS. 3A and 3B.

By way of illustration and not limitation of the invention, the physical characteristics a chuck like that illustrated in FIG. 5 are described. The dimension across opposing hexagonal sides of the frame was 5.8 inches and the height from working surface to frame top was 2.6 inches. Each chuck layer had six rectangular commercial Fe—Nd—B permanent magnets 2.25 inches long, 0.8 inch high, and 0.2 inch thick. The magnets were magnetized with the N pole on one major rectangular surface and the S pole on the opposite rectangular surface. The outer diameter of each pair of opposing pie-shaped, soft magnet steel blocks was 5.3 inches. When the chuck layers were in their magnetically active positions the holding force of the chuck for a ferromagnetic workpiece was 3,200 pounds force (14.2 kN).

FIG. 6 shows the front face, the workpiece holding surface, of a magnetic chuck 200 comprising a plurality of modular magnetic chuck members. Magnetic chuck 200 comprises a unitary square frame 202 with four sides 204 and orthogonal vertical and horizontal ribs 206 for holding a 5 by 5 array of twenty-five identical modular magnetic chuck members 208. Frame 202 is suitably made of steel or other strong material for mechanized handling of the multi-piece chuck 200.

In this embodiment of the invention, each modular magnetic chuck member 208 has a square non-magnetic frame 210 that is removably secured within sides 204 and/or ribs 206 of unitary chuck frame 202. Within each non-magnetic frame 210 are four permanent magnet plates 212 radiating outwardly from a non-magnetic centerpiece 214. Four identical pie-shaped blocks 216 of soft magnetic material separate permanent magnet plates 212. Soft magnet blocks 216, permanent magnet plates 212 and non-magnetic centerpiece 214 form the upper chuck layer of each of the twenty-five modular magnet members 208. The permanent magnet plates 212 are magnetized through their thickness and arranged as described with respect to FIG. 4A to impose alternating N-S-N-S magnetic polarities in soft magnet blocks 216. In this example, the upper chuck layers are the non-rotating layers of the modular magnet members 208. The modular magnet members 208 are secured in chuck frame 202 by pins, rods, set screws, or the like, not shown in these drawing figures.

Magnetic chuck 200 may be adapted for holding a particular workpiece by magnetically activating some or all of its twenty-five individual modular chuck magnet members 208. Or, as is illustrated in FIG. 7, some of the modular chuck magnet members 208 may be removed from chuck fame 202 for receiving the workpiece.

Figure 7:
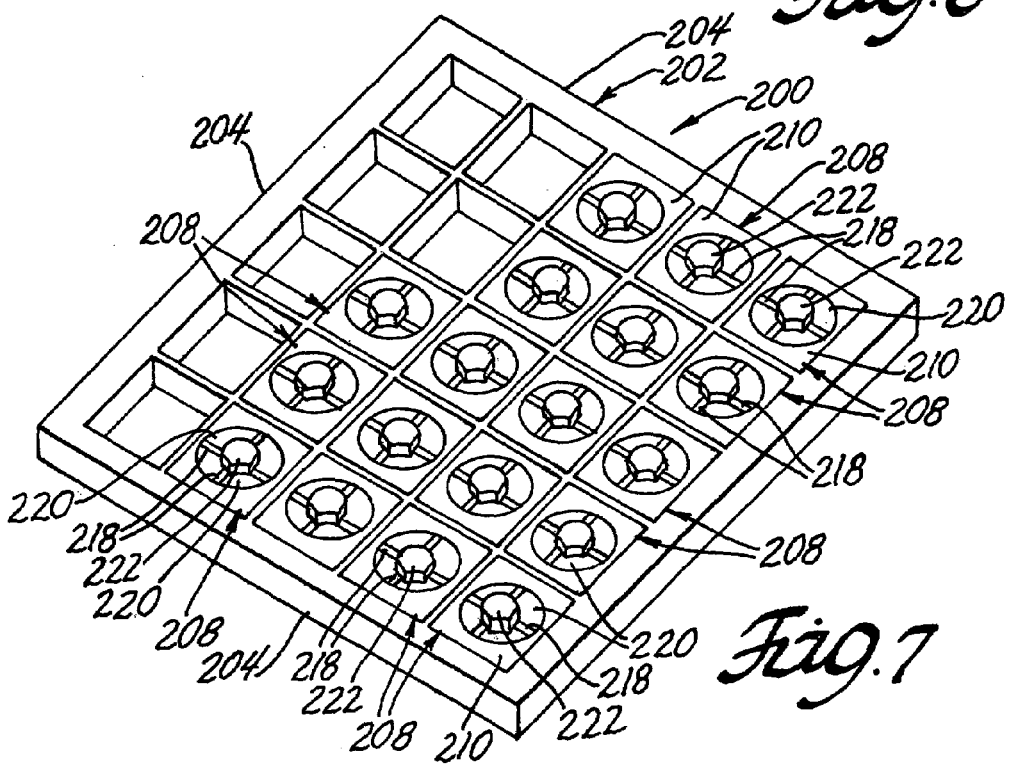
FIG. 7 is a view of the back face of a multi-piece modular magnetic chuck of FIG. 6 with a few modular chucks removed.

FIG. 7 shows the rear face of multi-piece modular chuck 200. In addition to showing the rear face of chuck 200, the chuck is illustrated with seven of its modular magnet members removed. The remaining modular magnet members 208 each have a non-magnetic frame 210 with the four permanent magnet plates 218 and four pie-shaped soft magnet blocks 220 of their rotatable backside chuck layers. The permanent magnet plates 218 are magnetized through their thickness and arranged as described with respect to FIG. 4A to impose alternating N-S-N-S magnetic polarities in soft magnet blocks 220. The backside chuck layer of each modular chuck magnet member 208 is rotated between chuck magnetically active and inactive positions by mechanical engagement and rotation of center-nut 222 which is attached to a non-magnetic central rod, hidden below center-nut 222 in FIG. 7.

Thus, multi-magnet piece chuck 200 uses many individual magnetic chuck members 208 of this invention to adapt a chuck holding surface to workpieces of different contacting surface shapes and areas. Each magnetic chuck member 208 in the chuck frame 202 may be individually activated or removed to obtain a desired workpiece holding pattern on the upper, working surface of the chuck 200.

Practices of this invention of magnetic chucks have been illustrated in descriptions of preferred embodiments. However, the scope of the invention is not limited to the illustrated embodiments.

The invention claimed is:

1. A magnetic chuck comprising:
a first chuck layer and a second chuck layer, each of the chuck layers having a common center of rotation, a common periphery, and flat parallel upper and lower surfaces where one of the flat surfaces of one of the chuck layers is the working surface of the chuck for attracting and holding a workpiece;
the first chuck layer comprising an even number of permanent magnet plates, each permanent magnet plate having an inner end at the center of rotation of the first chuck layer and extending radially outwardly to the periphery, each permanent magnet plate having opposed plate surfaces perpendicular to the upper and lower surfaces of the chuck layer, the plate being magnetized with its north magnetic pole (N) and its south magnetic pole at its opposing plate surfaces, and each plate having opposed plate edge surfaces extending from the inner end of the plate to the periphery;
the first chuck layer further comprising a block of magnetically soft material interposed between each pair of magnetized permanent magnet plates around the center of rotation, with the magnetic poles of the plates being oriented so that the magnetically soft blocks are magnetized with alternating N and S polarities around the center of rotation, each block of magnetically soft material being larger than its adjacent permanent magnet plates and each block having opposing magnetically soft block surfaces lying, respectively, in the flat surfaces of the first chuck layer;
the second chuck layer comprising permanent magnet plates and soft magnet blocks that are complementary in shape and position to the permanent magnet plates and soft magnet blocks of the first layer, the first and second chuck layers being assembled in the chuck so that magnetized soft magnet blocks of one chuck layer can overlie magnetized soft magnet blocks of the other chuck layer;
the chuck being activated for magnetic attraction of a workpiece when the first and second chuck layers are positioned with respective overlying/underlying soft magnet blocks of the same magnetic polarity; and
the chuck being inactivated for magnetic attraction of a workpiece when the first and second chuck layers are positioned with respective overlying/underlying soft magnet blocks of opposite magnetic polarity;
whereby the working face of the chuck extends from the center of rotation to the periphery and comprises magnetically soft block surfaces that are each larger than the interposed permanent magnet plate edge surfaces.

2. A magnetic chuck as recited in claim 1 further comprising means for rotating one of the first and second chuck layers between a chuck activated position and a chuck inactivated position.

3. A magnetic chuck as recited in claim 1 in which the first and second chuck layers are of equal thickness.

4. A magnetic chuck as recited in claim 1 further comprising non-magnetic material separating the central edges of the permanent magnet plates of each chuck layer and non-magnetic material spacing the permanent magnet plates in the respective chuck layers.

5. A magnetic chuck as recited in claim 1 in which each chuck layer comprises four soft magnet blocks of the same top and bottom surface area.

6. A magnetic chuck as recited in claim 1 in which comprises six soft magnet blocks of the same top and bottom surface area.

7. A magnetic chuck as recited in claim 1 further comprising:
a non-magnetic frame enclosing the first chuck layer, the frame further enclosing the second chuck layer with its upper surface positioned against the lower surface of the first chuck layer and with the lower surface of the second chuck layer exposed as the workpiece holding surface of the chuck.

8. A magnetic chuck as recited in claim 1 further comprising:

a rotor connected to the upper surface of the first chuck layer;

a non-magnetic frame enclosing the rotor and first chuck layer, the frame further enclosing the second chuck layer with its upper surface positioned against the lower surface of the first chuck layer and with the lower surface of the second chuck layer exposed as the workpiece holding surface of the chuck.

9. A magnetic chuck as recited in claim 8 in which the workpiece holding surface of the chuck consists essentially of surfaces of soft magnet blocks spaced by radial strips of non-magnetic material.

10. A magnetic chuck fixture for holding workpieces of different contact surface areas, the magnetic chuck fixture comprising:

a frame having a magnetic chuck holding body, a workpiece holding surface on the body, and a surface on the body opposite the workpiece holding surface; and a plurality of individual magnetic chucks as recited in claim 1 contained in the chuck layer holding body, the individual magnetic chucks being spaced in the chuck layer holding body with individual workpiece holding surfaces aligned in the workpiece holding surface of the fixture body, each of the magnetic chucks being individually actuatable for accommodating the contact surface area of a workpiece.

11. A magnetic chuck fixture for holding workpieces of different contact surface areas, the magnetic chuck fixture comprising:

a frame having a magnetic chuck holding body, a workpiece holding surface on the body, and a surface on the body opposite the workpiece holding surface; and a plurality of individual magnetic chucks as recited in claim 1 contained in the chuck layer holding body, the individual magnetic chucks being spaced in the magnetic chuck holding body with identical individual workpiece holding surfaces aligned in the workpiece holding surface of the fixture body, each of the magnetic chucks being individually actuatable for accommodating the contact surface area of a workpiece.

12. A magnetic chuck fixture for holding workpieces of different contact surface areas, the magnetic chuck fixture comprising:

a frame having a magnetic chuck holding body, a workpiece holding surface on the body, and a surface on the body opposite the workpiece holding surface; and a plurality of individual magnetic chucks as recited in claim 1 removably attached in the chuck layer holding body, the individual magnetic chucks being spaced in the magnetic chuck holding body with identical individual workpiece holding surfaces aligned in the workpiece holding surface of the fixture body, each of the magnetic chucks being individually actuatable or removable for accommodating the contact surface area of a workpiece.

* * * * *